(No Model.)

J. D. KUTZNER.
PILL ROLLER.

No. 337,342. Patented Mar. 2, 1886.

WITNESSES:
Robt. Nesbith
O.B. Foy

John D Kutzner,
INVENTOR

BY Geo. Gunty
ATTORNEY

United States Patent Office.

JOHN D. KUTZNER, OF WILKES-BARRÉ, PENNSYLVANIA.

PILL-ROLLER.

SPECIFICATION forming part of Letters Patent No. 337,342, dated March 2, 1886.

Application filed November 23, 1885. Serial No. 183,629. (No model.)

*To all whom it may concern:*

Be it known that I, JOHN D. KUTZNER, a citizen of the United States, residing at Wilkes-Barré, in the county of Luzerne and State of Pennsylvania, have invented a new and useful Improvement in Pill-Rollers, of which the following is a specification.

The objects of my invention are, first, to provide a pill-roller with a removable rim, so that the parts may be easily cleaned; second, to provide an adjustment to the rim; third, to provide means by which is determined the adjustment of the rim to pills of certain diameters. I attain these objects by the mechanism illustrated in the accompanying drawings, in which—

Figure 1:
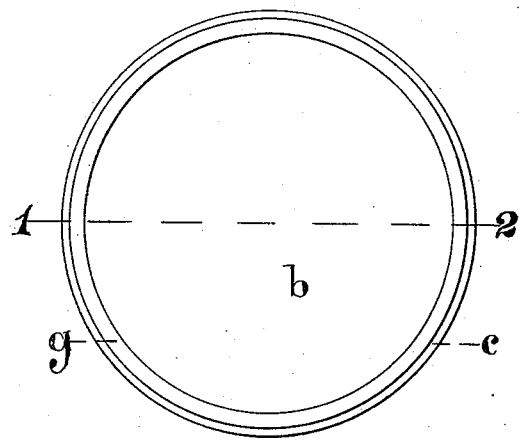
Figure 2:
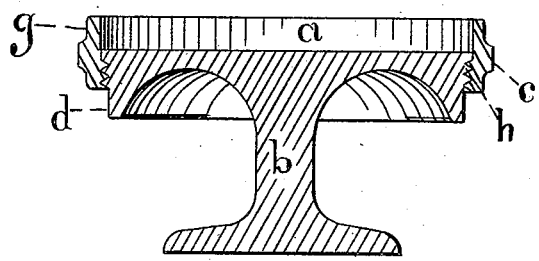
Figure 3:
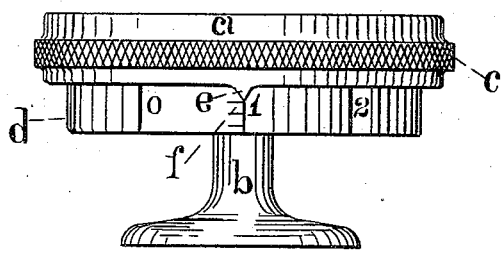

Figure 1 is a top view of the device. Fig. 2 is a cross-section on line 1 and 2, and Fig. 3 is an elevation of the same.

The rim $g$ and the stand $b$ constitute the device. On the stand $b$ is cut a screw-thread, the pitch of which may be ten or twenty to the inch—preferably twenty. Inside the rim $g$ is cut a similar thread, to match that on $b$, in conjunction with which it is designed to work. A part, $a$, of the inside of the rim is left smooth—that is, without thread—as is also the part $d$ of the stand $b$. On the outside of the rim $g$ is made a knurled surface, as shown at $c$, and $e$ is a pointer. Around the circumference of the part $d$ of the stand $b$ are made vertical graduations, as shown by the heavy lines 0, 1, and 2, and at $f$ are made horizontal graduations.

When it is desired to make pills—as, for example, one-tenth of an inch in diameter—the rim is adjustable, so that its edge is only that distance from the platen or top of the stand $b$. This is accomplished by screwing the rim down until its edge is flush with the platen or top of the stand, which may be determined by setting the pointer on the lowest horizontal graduation. Having determined this, the rim is then screwed up two revolutions, or until the pointer marks the third horizontal graduation. Having thus completed the adjustment, the composition is prepared in the usual manner and rolled, as with the ordinary pill-roller, either by the use of a paddle placed on the rim with one hand and moved about with a circular motion over the pills while the device is held with the other hand, or by laying the cut-up bits of composition on a board or other suitable flat surface and inverting the pill-roller over them and moving it around with a circular motion.

After the rolling has been completed and it is desired to clean the device it is only necessary to unscrew the rim from the stand, and both parts are easily cleaned with cloth or brush, as there are no sharp corners in which the composition may stick, so as to require its being removed with a pointed instrument.

Having fully described my invention, I claim and desire to secure by Letters Patent—

In a pill-roller, the combination of a stand, $b$, with an adjustable rim, $g$, the screw-threads $h$, and the circumferential and vertical graduations, all substantially as described, and for the purpose set forth.

JOHN D. KUTZNER.

Witnesses:
ROBT. NESBITT,
O. B. FRY.